INVENTOR.
JAMES W. MARTIN

INVENTOR.
JAMES W. MARTIN

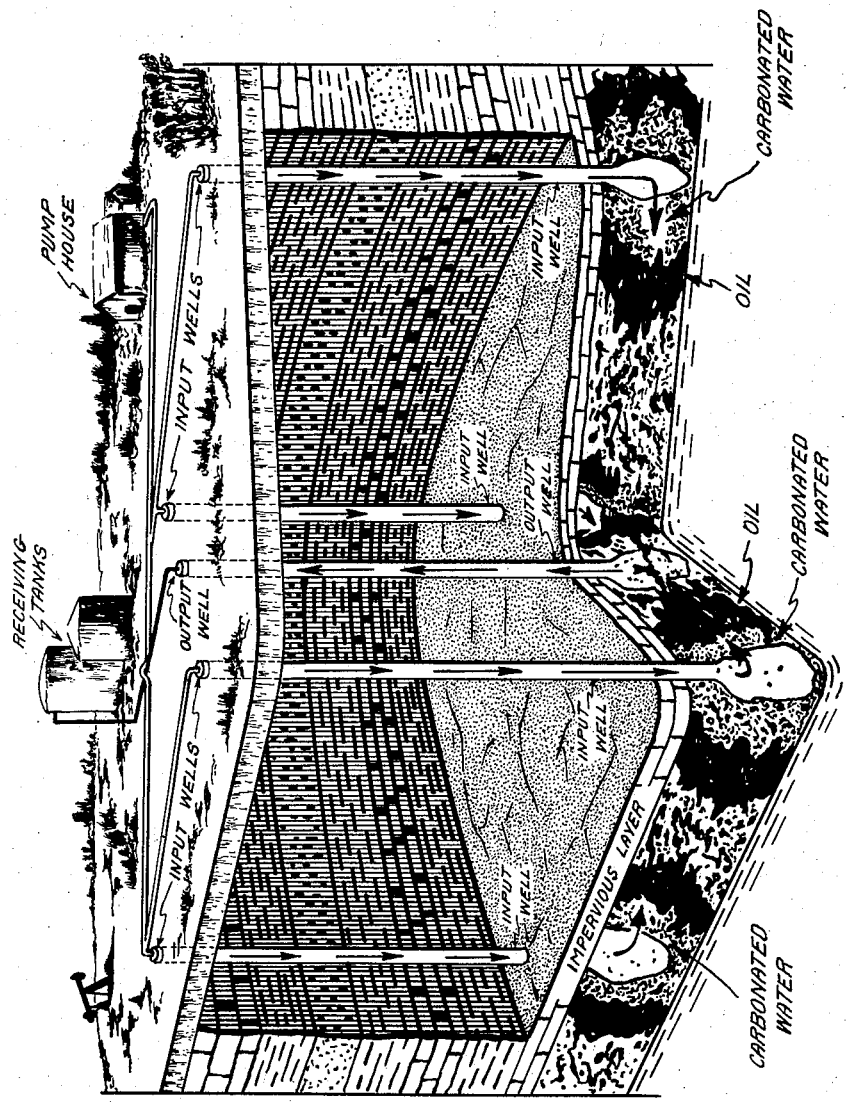

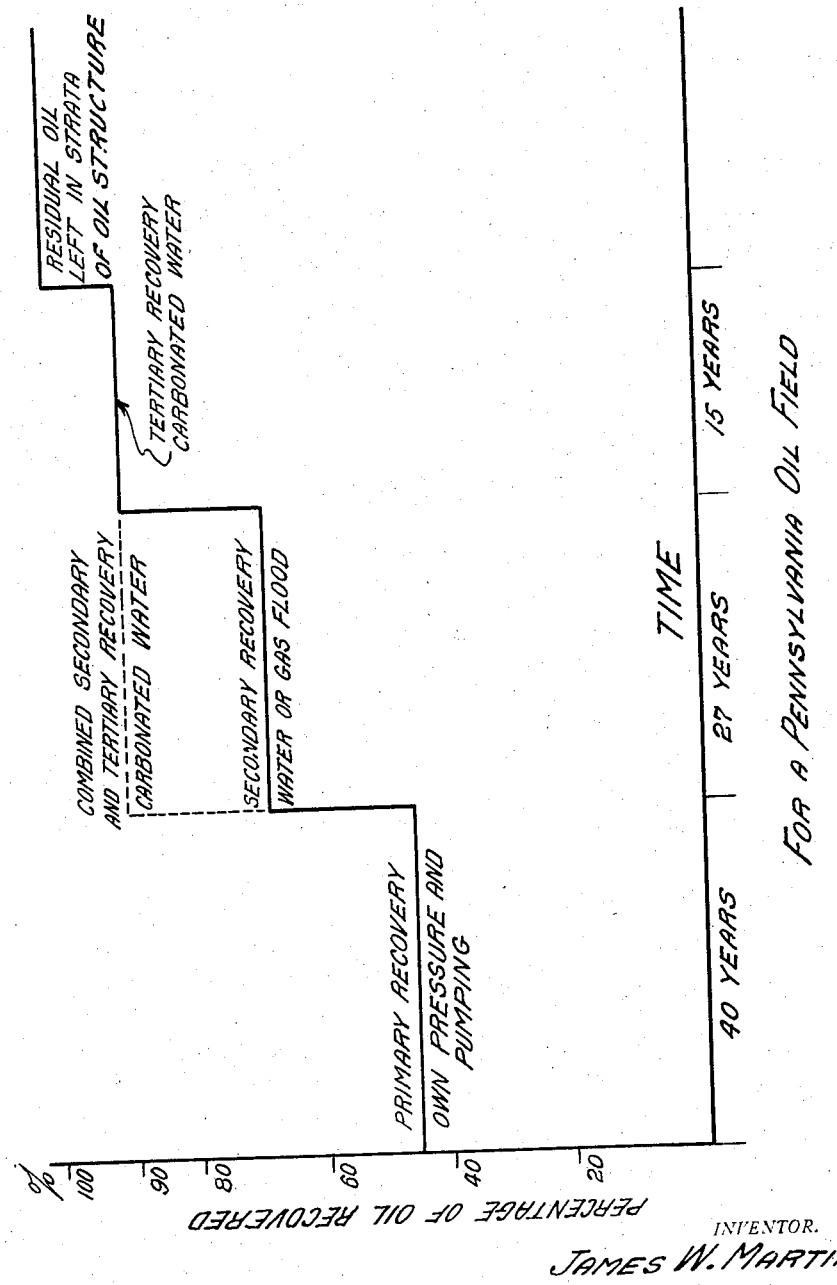

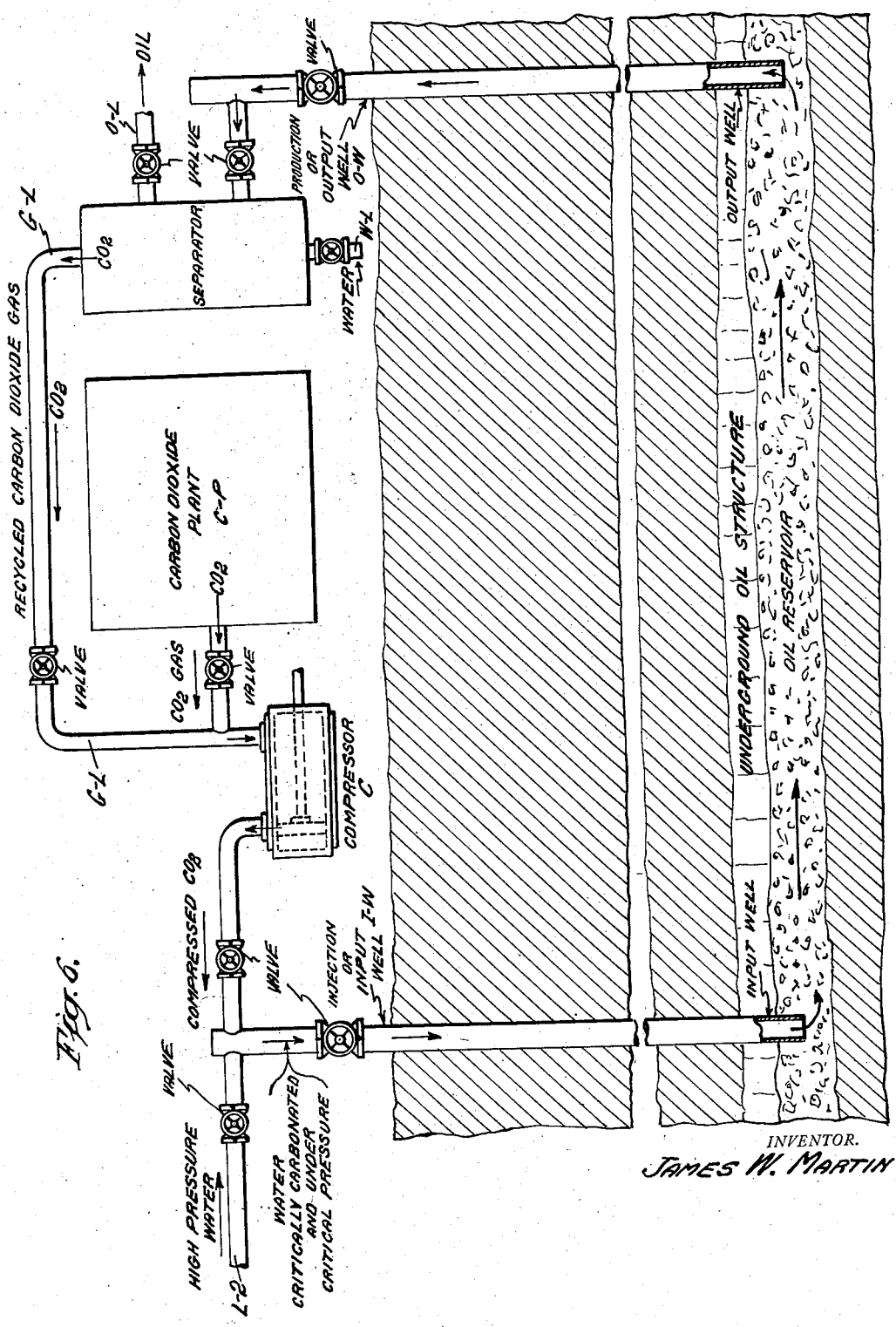

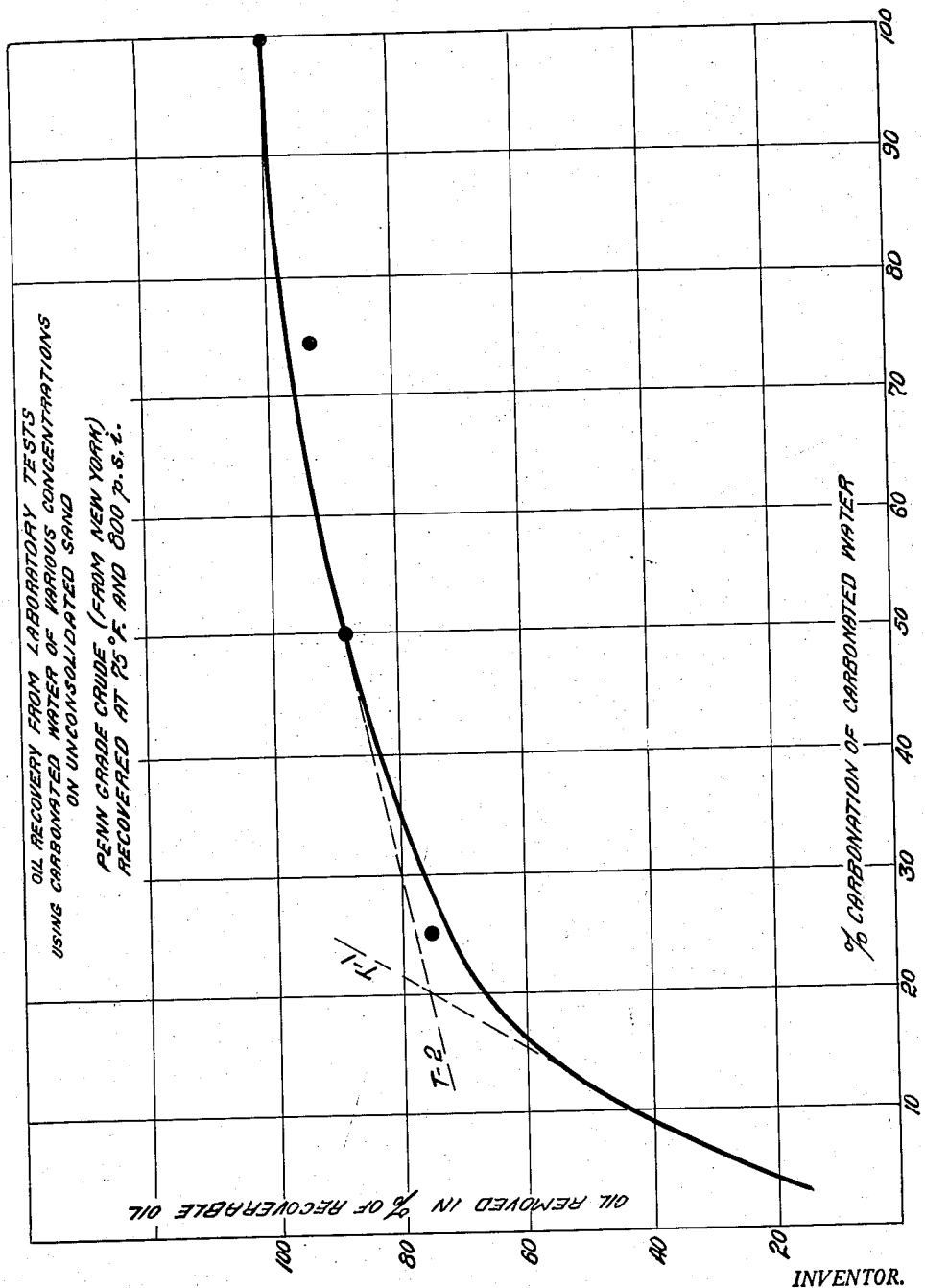

United States Patent Office 2,875,833
Patented Mar. 3, 1959

2,875,833

PROCESS OF RECOVERING OIL FROM OIL FIELDS INVOLVING THE USE OF CRITICALLY CARBONATED WATER

James W. Martin, Tuckahoe, N. Y., assignor to Oil Recovery Corporation, New York, N. Y., a corporation of New York Application February 4, 1954, Serial No. 408,126

2 Claims. (Cl. 166—9)

The present invention relates to an improved process of recovering oil from oil fields involving the use of critically-carbonated water, and, more particularly, to such an improved process used in recovering oil from oil fields when the pressure or permeability in the underground oil structure is insufficient to cause the oil to flow freely from the output or production well and where the oil is insufficiently fluid to flow freely through the oil structure to the output or production well, which process is especially adapted for the tertiary recovery of hydrocarbons from low pressure, non-free-flowing reservoir rocks in an oil structure by the use of critically carbonated water.

Those skilled in the petroleum industry know that oil and gas migrated from their original source, known as "source rocks," in which the parent organic matter was deposited, through "carrier beds" to the "reservoir rocks" in which they were accumulated and stored by nature. Upward escape of the reservoir fluid was prevented by impervious "cap rock." An oil and gas reservoir may be defined by a body of porous and permeable rock containing oil and gas through which fluids may move toward recovery openings or wells under the pressures that exist or that can be applied. Sands, sandstones, and limestones were formed as a result of processes of sedimentation in which mineral fragments of assorted size or shapes were gradually fitted together under water, later to be compacted by weight of superimposed strata. Pore openings in limestone are frequently much less uniform in shape and size than those in sands and sandstone. Rock openings were, in many cases, formed by solution and watering and were extremely irregular in shape and distribution. The storage capacity afforded by rock stratum for fluids is measured solely by its interstitial pore space or pore volume. This body of porous rock is known as "an oil sand" regardless of its mineral composition. A cubic foot of sand or sandstone presents a very large surface to the fluid stored within it and a vast number of individual communicating pores were formed between the grain comprising it. Porosities in excess of 30% are uncommon and most commercial oil sands range between 15% and 25%. The permeability of a reservoir rock or oil sand, usually expressed in "millidarcies," is a measure of the resistance offered to the movement of fluids through its pore spaces.

It is well known that petroleum usually occurs in porous structures in the earth from which rarely as much as 50%, often only 30%, of the total oil can be lifted to the surface of the ground by ordinary oil well practice. Likewise, it is also known that the useful life of an oil well is limited. For instance, the U. S. Bureau of Mines is authority for the statement that more than three-fourths of this nation's oil wells are now "strippers" draining fields that once produced "gushers" or flowing wells. Those skilled in the art in the oil industry are well aware that eventually the flow of oil into the "strippers" will become so slow as to render them uncommercial or "spent." Further, it is realized that vast areas contain oil-bearing structures which contain oil in insufficient proportion to flow in commercial quantities. To recover the residual oil, in some cases a pressure drive has been applied by pumping water into the structure known as water flooding. In other cases, air or natural gas or other gas has been pumped into the structure to produce a pressure within the oil sand, known as a gas drive. (See U. S. Patents Nos. 1,067,868 to I. L. Dumin; 1,249,232 to Frederick Squires; 1,688,586 to J. O. Lewis. 1,826,371 to P. J. Spindler; and 1,978,655 to H. R. Straight.) None of the prior methods has proved universally successful and at best these methods serve only to mechanically force the fluid or non-absorbed oil from the porous structures by replacement. For instance, Squires pointed out that the use of air created a dangerous, highly explosive mixture in the reservoir and that natural gas was generally too expensive. This investigator proposed the use of exhaust gas from internal combustion engines and the use of flue gas from stacks in place of air or natural gas. Exhaust gas from a gasoline engine usually contains 79% of nitrogen, 2% oxygen, 6% carbon monoxide, and 9% of carbon dioxide (balance largely hydrogen and methane). Exhaust gas from a gas engine as used in an oil field is about 88% nitrogen and about 11% carbon dioxide; whereas flue gas usually contains 84% of nitrogen, 2% of oxygen, 1% carbon monoxide, and 12% of carbon dioxide (balance largely water vapor, hydrogen, etc.). Squires contemplated pumping water and gas into the strata and he thought that the action of the gas would be to volatilize part of the crude oil and that the water would agitate the liquid hydrocarbons in the strata and thus promote the volatilizing or distilling action of the gas. In fact, Squires preferred using hot water to better bring about the volatilization of the hydrocarbons. (See U. S. Patents Nos. 1,238,355 and 1,249,232.) Then, again, while Russell proposes to inject a gas in supersaturated solution, he actually proposed to apply this gas to the oil sand in the form of gas bubbles to which the oil would attach itself as a film. (See U. S. Patents Nos. 1,511,067 and 1,658,305.) In other words, Russell endeavored to obtain his results solely by injecting a supersaturated solution containing carbon dioxide which would act in the undissolved or gas phase. Furthermore, Cloud suggested the use of water gas alone or with acetylene. The preferred percentage of acetylene is from 15% to 30%. (See U. S. Patent No. 1,697,260.) As is well known, water gas usually contains approximately 48% hydrogen, 38% carbon monoxide, 7.2% nitrogen, 5% carbon dioxide, 1.2% hydrocarbons and 0.6% oxygen. (Mark's Mechanical Engineers Handbook, page 822, Revised 5th Edition, 1951.) In all of the foregoing processes, the prior investigators always used the pressure fluid in the gas phase. In other words, air, a gas, or a mixture of gases was employed and was pumped down an inlet well to produce a gas drive just like water was pumped down to produce a water flood. When attempts were made to utilize carbon dioxide, the amount, concentration, or percentage was too low to be effectively used in the present invention. For example, when engine exhaust gas was used, the percentage of carbon dioxide in the gas was only about 9% or so whereas when flue gas was used, the percentage was only about 12% or so and when water gas was used the percentage was only about 5% or so.

Processes for treating oils or hydrocarbons with carbon dioxide (as a liquid or as a gas) were disclosed by Auerbach and also by Pilat and Godlewicz for the purpose of effecting a separation and purification of oils and hydrocarbon mixtures into light fractions and heavy fractions. (See U. S. Patents Nos. 1,805,751; 2,029,120; 2,188,013; 2,315,131; and 2,631,966.) If carbon dioxide were to be used in oil recovery, the lighter fractions would be removed and the heavier fractions including waxes, asphalts, etc., would remain and clog the interstices within the oil sand and retard or prevent any further recovery of oil. In other words, if an attempt were made to apply the processes of Auerbach and of Pilat et al. to the instant non-analogous art, it would not be practical or even operative.

Although various attempts were made to solve the problem confronting the art, nobody ever found a practical, feasible and economical process of recovering oil from spent oil fields, especially those which previously had been subjected to primary and/or secondary recovery.

It has now been discovered that critically-carbonated water can be used chemically as well as physically in a novel method whereby the mixing, combining, dissolving, suspending, and recovering of hydrocarbons with critically-carbonated water can be effected. Carbon dioxide as it exists in such carbonated water is practically 100% in purity.

It is an object of the present invention to provide an improved process of using critically-carbonated water, brine or other appropriate aqueous solution for the recovery of a portion of the oil which under conventional conditions is retained in the oil-bearing structure after standard oil well procedure has ceased to be commercially valuable.

Another object of the invention is to provide an improved process for the recovery of oil from spent oil wells involving the pumping of critically-carbonated water down into the oil-bearing structure under such conditions as will obtain critical carbonation of the water within a critical range of 20% up to 100% saturation (based on volumetric proportions) and thereby permit the efficient removal of hydrocarbons by the critically-carbonated water, etc., with the production of good oil recovery yields.

The invention also contemplates providing an improved process for the recovery of oil from spent oil reservoirs which involves applying critically-carbonated water to those oil reservoirs selected as capable of withstanding and maintaining certain selected pressures which are largely determined for the particular dome or field by the depth of an oil structure below the surface level and which are normally above 200 p. s. i. (pounds per square inch).

It is a further object of the invention to provide an improved process of oil recovery through using critically-carbonated water alone or in conjunction with another agent, chemical or catalytic, or a mixture of both, to modify the viscosity of the crude oil residing in an oil-bearing structure in order to make said oil more readily removable by said carbonated water and thus more easily removed from the said structure by the injected carbonated water.

A further object of the invention is to provide an improved process comprising introducing carbon dioxide under pressure into water to form an unsaturated aqueous solution to produce critically-carbonated water, pumping the same down an input well or wells into a petroleum-bearing structure or injecting the desired proportion of carbon dioxide and water to produce critically-carbonated water formed at the bottom of the input well and to bring about the transfer of the petroleum from the oil structure to an output well along with carbonated water and from the output well recover the partially decarbonated water for re-use in the process, recycling any separated carbon dioxide for re-use in the process, and recovering the petroleum for shipment.

It is also an object of the invention to provide an improved process of oil recovery by using critically-carbonated water to treat crude oil in oil sand and to act as a mild oxidizing agent which produces unsaturated hydrocarbons and carbon monoxide as well as organic acids either as free acids or as salts or soaps, such as calcium propionate, which will be found in the aqueous phase.

Other objects and advantages will become apparent from the following description taken in conjunction with the accompanying drawings, in which:

Fig. 4 is a cutaway illustration of an oil sand pierced by a five-spot arrangement of wells, four outer ones constituting the input wells and one central output well;

Figure 1:
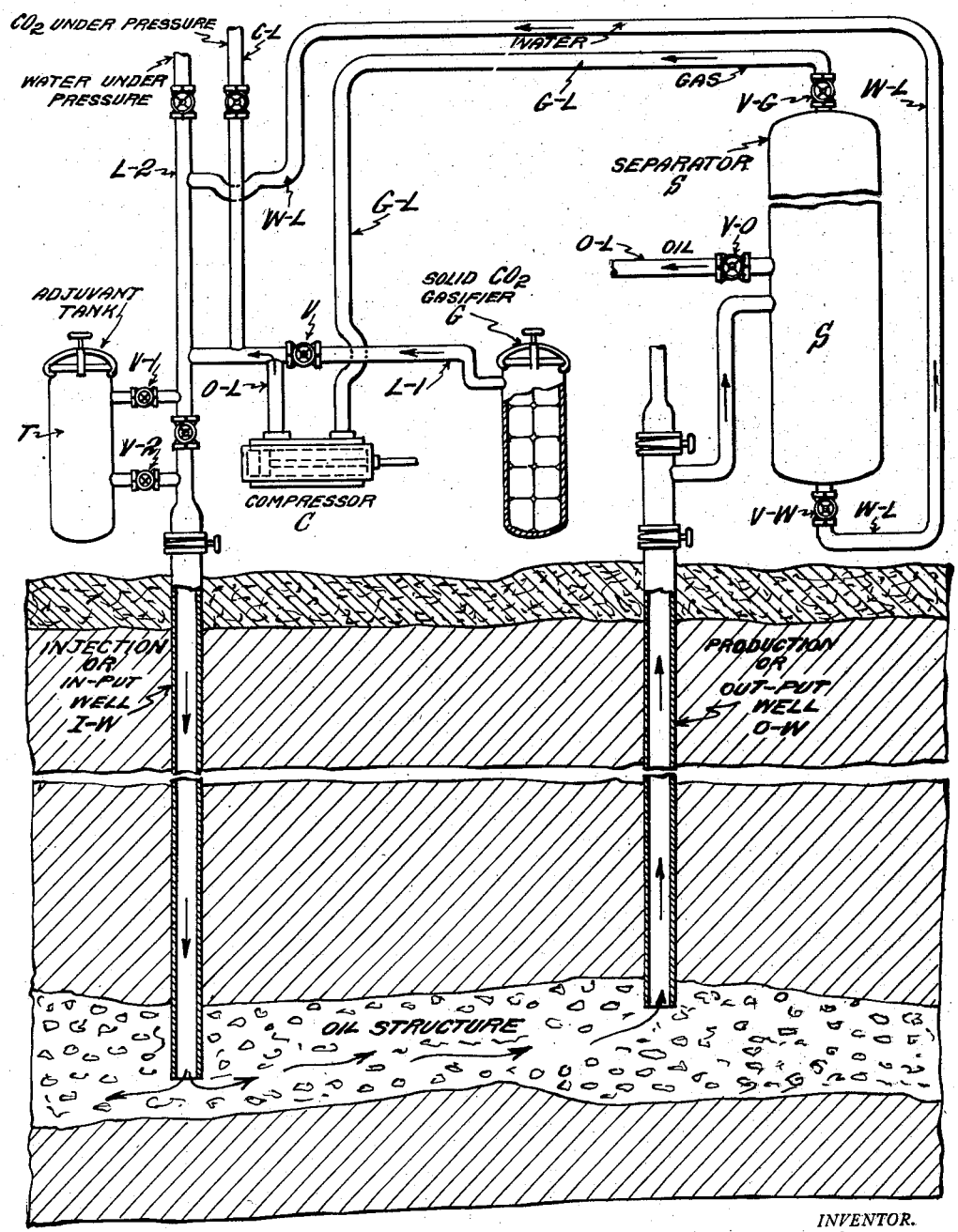
Fig. 1 is a diagrammatic view of an oil well in an oil-bearing structure with equipment on the surface of the earth or ground for carrying the novel method of recovering oil from spent oil wells into practice.
Figure 2:
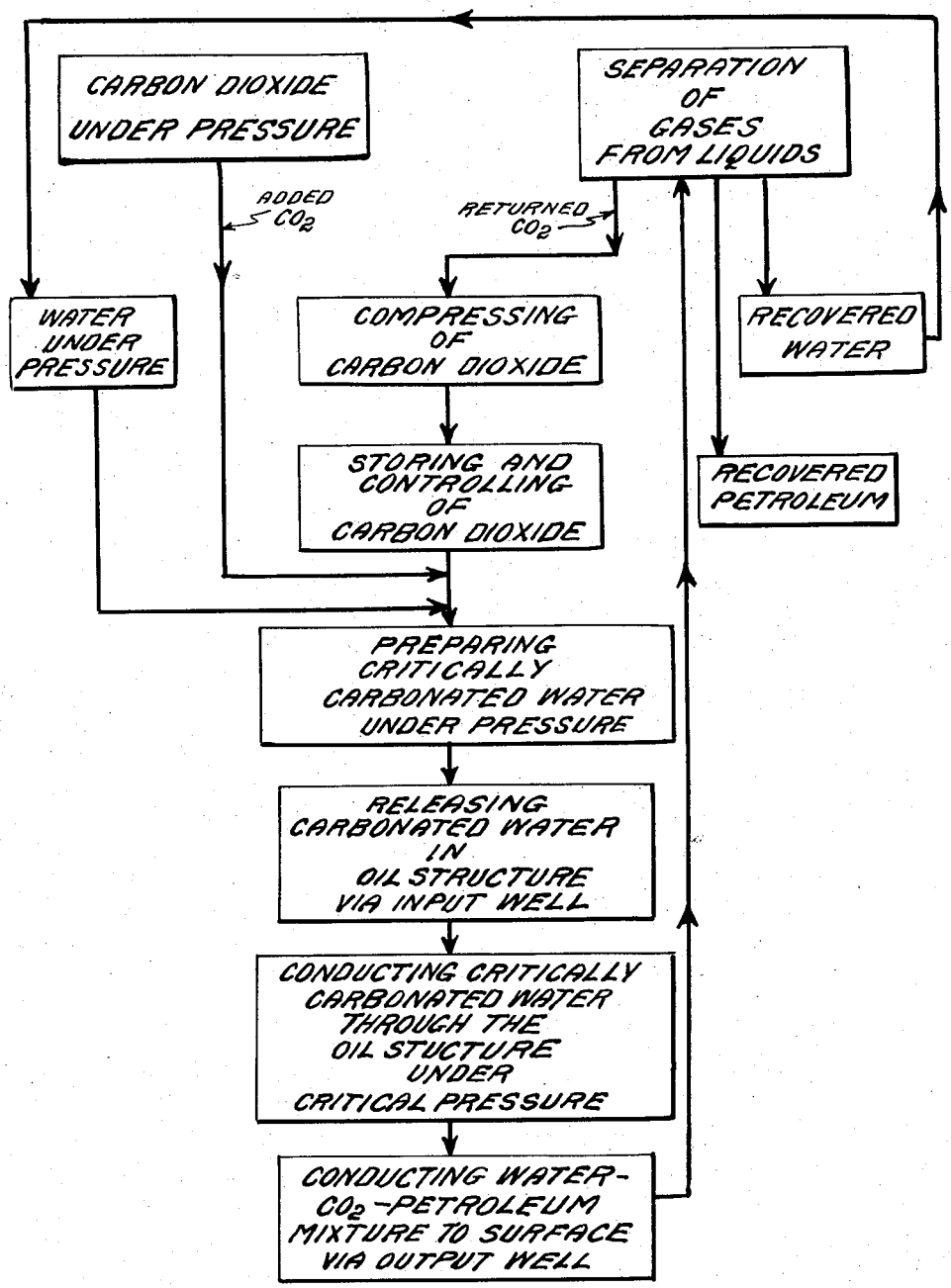
Fig. 2 depicts a flow sheet showing operations involved in the improved method of recovering oil from spent oil wells.

Fig. 5 shows graphically the history of a typical oil well which has passed through the various recovery stages and the approximate percentages of the original oil in the oil strata recovered in each stage as well as the residual amount of oil, about 10%, finally left in the strata, the dotted lines indicating the advantage of combining the customary secondary water flood with my novel tertiary recovery and thereby saving the expense of much water and the pumping thereof as well as saving years of operation;

Fig. 6 is a diagrammatic view similar to Fig. 1 except that a conventional carbon dioxide plant is used in place of a solid $CO_2$ gasifier for supplying carbon dioxide for making carbonated water; and Fig. 7 depicts a curve showing the relation of the percentage of carbonation of carbonated water and the percentage of oil recovery.

My process can also be used with advantage in the primary production stage of an oil well and thereby the daily rate of flow of a flowing or pumped well may be increased and also the total production during the primary stage can be increased. Similarly, the improved process can be used in connection with secondary recovery. By pumping critically-carbonated water, preferably more than half saturated with carbon dioxide (i. e., 50% carbonated), into oil sand, the pressure within the sand will be increased by the volume of water introduced and this carbonated water will give some of its carbon dioxide to to the crude oil occurring in the sand.

Broadly stated, my new process preferably comprises forcing under pressure an aqueous solution or a similar brine solution (herein known as carbonated water) critically saturated or carbonated with respect to carbon dioxide into an input well or wells in such a manner that it will pass through the oil-bearing structure to an output well located at a distance of say fifty to several hundred feet away and from which output well it, with its accompanying oil, is returned to the surface of the ground. At the surface of the ground, the oil, aqueous solution, and gases are separated by conventional equipment and the water and gases including carbon dioxide returned for re-use to form again as an aqueous solution of carbon dioxide of specially desired concentration (critically-carbonated water) for injection into an input well. In the event that some additional carbon dioxide is needed to replace losses, it is added at any convenient point in the system to maintain the aqueous solution in the form of critically-carbonated water. In general, it is preferable to treat the whole area of the oil sand with critically-carbonated water and to inject a minimum of about one-third of a pore volume to a maximum of about two pore volumes of critically-carbonated water. The preferred amount of carbonated water which is injected in order to treat the whole of the oil sand is about one pore volume.

The amount of carbon dioxide which can dissolve in water is dependent on the temperature and purity of the water and on the partial pressure of carbon dioxide. However, in using carbonated water as a water flood for oil reservoirs, it can be stated, as a generalization, that the maximum, or 100% carbonation, is about 30 volumes of carbon dioxide per one volume of water; thus 80% carbonation is equivalent to 24 volumes of carbon dioxide per volume of water, 50% equivalent to 15 volumes and 20% equivalent to 6 volumes of carbon dioxide. Under field conditions, volumes may differ from said percentage equivalents; under such conditions the higher volumetric concentration shall apply.

With lower concentration than 20% (or 6 volumes of carbon dioxide per volume of water) rates of oil recovery rapidly decrease; with my required critical concentrations of about 20% to 100% carbonation, the rate of oil recovery gradually increases as the percent of carbonation increases. My preference is for the range of about 50% carbonation (or 15 volumes of carbon dioxide per volume of water) to 80% carbonation (24 volumes) but there is no disadvantage of using complete saturation under oil reservoir conditions.

It is essential in carrying the present invention into practice that substantially no carbon dioxide in the gas phase pass through the oil reservoir. It has been found that when carbon dioxide gas is brought into contact under raised pressure with crude oil, it will cause topping of the crude, i. e., cause evaporation of the light petroleum fractions. In an oil reservoir, such a detrimental effect brings about the precipitation of wax and heavy petroleum fractions in the interstices of the oil sand which tends to prevent the passage of fluids.

To avoid the presence of carbon dioxide gas, it is necessary that the water or brine be carbonated to a critical concentration which will be stable at the reservoir temperature and pressure. Thus, the proportion of carbon dioxide to water shall not exceed that in which the carbon dioxide will remain in aqueous solution under the conditions of mean reservoir pressures.

The temperature in an oil structure is determined in part by its geographical location but in general it is higher for the deeper wells. The pressure on a non-free-flowing oil sand varies but slightly with the location of the field but in general approximates the weight of a column of water equaling the depth of the well to the structure. For example, a well about 1000 feet deep would have a pressure of about 400 p. s. i. or so, say, 430. Such a pressure appears to promote adequate exchange of carbon dioxide from the critically-carbonated water to the oil. In general, the higher the pressure, the better the improved process operates. The larger proportion of oil reservoirs being water flooded are flooded at minimum reservoir pressures of about 400 p. s. i. and maximum reservoir pressures in excess of 3000 p. s. i.

The time required by my novel treatment of the oil structure, by which the petroleum oil is set free and flows to the output well, is relatively unimportant in commercial practice, as the distance between an input well and its output well is normally more than 100 feet and the time necessary for the treating solution to traverse through 100 feet of normal oil structure is more than ample to obtain the desired result. In actual practice, the time required to traverse 100 feet is usually more than 100 days.

Carbon dioxide in solution under my operating conditions is a mild oxidizing agent as is evidenced by analyses of the products given by the output well showing unsaturated and lower density hydrocarbons and carbon monoxide in the gas and oil phases and organic acids either as free acids or as salts, e. g., calcium propionate, in the aqueous phase. The gas unsaturates as found by experienced operators of the mass spectrograph were largely the $C_4$ and $C_5$ unsaturates. Ethylene and propylene, if formed, would be expected because of their high solubility to be in the water phase. Unsaturates in the gas were shown both by the bromine and sulfuric acid tests and by tests carried out by mass spectrometer. Moreover, tests on the gas typical of these oil fields before treatment by my novel process showed them to be quite free from unsaturates. Also the original connate water is free from propionic acid and its salts.

When the residual gases from an output well on analysis of the oil commence to show carbon monoxide or unsaturates such as propylene, butylene or pentylene, one can be sure that my novel process has and is being used on the oil structure below. However, this conclusion may not hold when the field is one in which the native natural gas carries carbon dioxide in substantial amounts. Many, if not all such fields, have "condensate" reservoirs, i. e., deep reservoirs where oil and gas exist in a single gas phase and the oil is commercially separated by retrograde condensation as a nearly white crude oil of high gasoline content.

The addition to my critically carbonated water of appropriate adjuvants including antioxidants and other reducing agents prevents any increase in viscosity of the oil, probably by decreasing the susceptibility to oxidation and at the same time speeds up the separation of the oil from the oil sand or limestone. Typical adjuvants of this type are sodium sulfite, hydrogen sulfide, cresols, resorcinol and salts of hydroxy acids, such as tartaric or citric acid, etc. Another type of adjuvant, hydrocarbon gases such as natural gas which has been referred to hereinbefore, is particularly desirable when the crude petroleum is at all viscous. Carbon dioxide has been found to be more reactive with methane through decane than with other hydrocarbons. Adjuvant, as used herein, is used to mean "any substance designed to assist the principal means" wherein the principal means in the present process is carbonated water.

For the purpose of giving those skilled in the art a clear understanding of the invention, the following example is given:

In an oil field near the Pennsylvania-New York border, where both primary and water flooding secondary oil recoveries have been commercially completed, equipment for the production of a water solution of carbon dioxide was provided to carry the improved process into practice. Fig. 1 shows typical input and output wells such as may have been used for secondary recovery by water flooding, except that in practice the two were separated by perhaps about 100 feet. With a five-spot arrangement, the depth of the four input and one center output wells used was about 1200 feet. The bottom hole temperature was about 65° F. and the mean reservoir pressure above 800 p. s. i. For this example, I used aqueous solutions of carbon dioxide at various concentrations, but found that, cost considered, a 50% carbonation was to be preferred. This means about 15 volumes of gaseous carbon dioxide (measured under standard condition of 0° C. and 760 mm. pressure) dissolved in one volume of water.

Carbon dioxide is supplied to the system, preferably through the use of a solid carbon dioxide gasifier G, as illustrated in Fig. 1. From the gasifier, the carbon dioxide gas flows under pressure through the pipe line L–1 connected to a high pressure water line L–2 to control tank T in which is placed the adjuvants or additive compounds that have been described heretofore. Pressure of the gas from the solid carbon dioxide gasifier G is regulated by a valve V placed in the gas line L–1 and by the amount of heat that is supplied to the Dry Ice within the gasifier. The amount of adjuvant, catalyst or the like from the control tank T is regulated by appropriate valves V–1 and V–2. Supplementary water under high pressure can be supplied through valved line L–2 and supplementary carbon dioxide under high pressure can be supplied through valved line C–L.

Carbonated water which may contain adjuvants or additive substances flows through the oil sand from the bottom of input well I–W permeating the structure and reacting with the crude oil and gradually flows, due to difference in pressure, toward the bottom of output or production well O–W. Oil and water in which the carbon dioxide and gaseous hydrocarbons have been dissolved flow upward through output well O–W and discharge into hydrocarbon separator S. In the output well and in the separator the carbon dioxide and hydrocarbon gases which have been dissolved in the highly carbonated water and oil are separated due to changes in pressure and temperature and by the refluxing action within the separator so that they may be drawn off. Thus, the oil can be withdrawn from the separator via oil line O–L whereas the water is withdrawn via water line W–L and the gas containing carbon dioxide, etc., via gas line G–L. As those skilled in the art will understand, appropriate valves V–O, V–W and V–G, respectively, are provided in the aforesaid lines to control the flow of oil, water and gas, respectively. In cases where methane, ethane, and other hydrocarbons, which liquefy at temperatures lower than carbon dioxide, are important components, these components may be separated by means of a carbon dioxide condenser not shown in the drawing, but of a nature well understood by those skilled in the art. Upon the liquefaction of the carbon dioxide, the uncondensed gases may be taken off from the top of the condenser and removed from the system. In normal operation, however, much of the light hydrocarbon gases can be recycled with the carbon dioxide. The exit gases containing the bulk of the carbon dioxide gas and such admixture of the light hydrocarbon gases as desired can be conveyed via gas line G–L to the compressor C and can be re-pressurized to a selected and/or controlled pressure and then recycled through the system via outlet pipe line O–L which is connected to the main pipe line L–1.

Passage through the oil structure from the input well to the output well took some weeks. In practical testing of the process, it was found to be satisfactory to pump carbon dioxide and water in the desired measured amounts into the well and thereby furnish the 50% saturated or carbonated solution to the oil structure. Fig. 5 shows the output of oil with time; however, in a sand of normal or high permeability the time periods indicated will be greatly lessened as compared to the time periods taken in this oil field with its sand of low permeability. Once the oil structure was partially filled with the partially saturated or carbonated water, it was followed by a bank of the cheaper uncarbonated water which pushed ahead of it the oil set free from the oil sands by the critically-carbonated water. In this new water flooding, it was noted that the capacity for injecting water was now greatly increased as to what it had been previous to the treatment with the partially carbonated water, e. g., 90 barrels water a day per input well where previously it was 55 barrels.

In this field testing operation in a typical paraffin-type Pennsylvania grade oil field, only four input and one output wells were used. This oil area (Allegany County) near Richburg, New York was opened in 1881 and primary recovery continued until 1920 and was followed by water flooding until 1947 when the yearly oil production was at the rate of 92 barrels per acre. In the first year of the application of carbonated water, production rate increased to 1045 barrels per acre and the curve of production as shown by my process indicates that when the tertiary production ceases, there will have been still further production of about 2000 barrels per acre, which is a very considerable gain due to this novel process.

Figure 3:
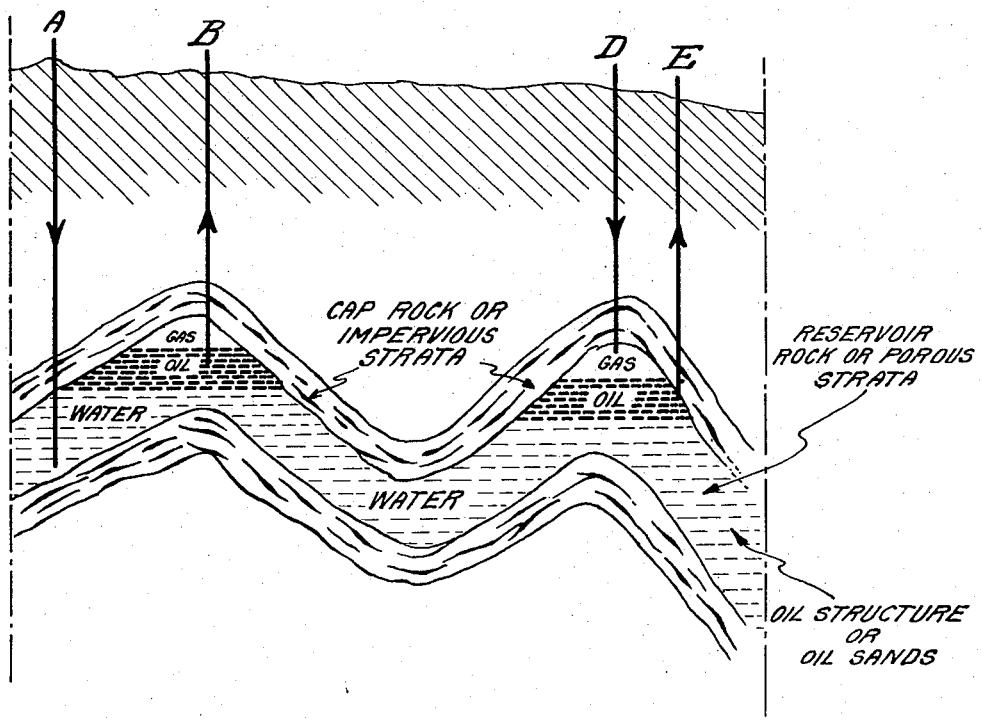
Fig. 3 illustrates a diagrammatic view of a type of oil structure and associate input and output wells for carrying the present invention into practice.

The present invention can be carried into practice with oil structures in which oil is accumulated in anticlines as well as in synclines. By referring to Fig. 3, it will be observed that an input well and an output well can be driven to the oil structure. In Fig. 3, the oil is accumulated in the anticline which is the most usual condition. The pressure which has been imposed upon the oil and gas by the pressure of the water rising upward through the reservoir rocks, has been diminished because pressure has been withdrawn through the producing wells more rapidly than the pressure has been generated by the rising of the water level. This rising of the water level is retarded and often virtually stopped by the fact that the reservoir rock is saturated with oil and thus rendered relatively impermeable to the water. It should be recognized that the reservoir rock that is under the surface of the water and that rock which contains natural gas both may be wetted by oil. Whether the well for injecting the carbon dioxide solution should be at point A or at point D (Fig. 3) for example, which are respectively below and above the oil and, thus, below and above producing wells B and E, would be determined by the nature of the geological structure. In the case of well A, the introduction of carbon dioxide solution would tend to cause the oil remaining in the reservoir below the water line to disengage itself from the reservoir rock and rise into the oil pool accumulating in the anticline structure and later exit through outlet well B. On the other hand, the solution of carbon dioxide injected in well D, would tend to cause the oil that has been absorbed in the reservoir rock of the gas reservoir above the oil layer to disengage itself and thus increase the flow of oil into the oil pool in the structure; further, the pumping of the carbon dioxide solution would create some pressure and would force oil upward through producing well E.

As those skilled in the art know, all oil sand contains a substantial amount of the alkaline-earths (calcium, magnesium, etc.). Oil sands are sedimentary deposits of ancient oceans which teemed with Molluscan life. In addition to the solid minerals resulting from the fossilized shells of these ancient mollusks, there is in connate water, i. e., the concentrated sea water remaining entrapped in this oil sand, also a substantial proportion of alkaline-earth salts.

A certain amount of carbon dioxide contained in any carbonated water passed through an oil sand will be used up or neutralized by these alkali-earths. In order to have carbon dioxide available for reaction in the oil, the amount injected must be greater than that used up by the alkali-earth. When carbonated water is introduced into the oil sand, regardless of whether the sand contains only a small proportion of alkaline-earth material, or whether it is primarily limestone or dolomitic oil sand, a definite proportion of the carbon dioxide is converted to alkali-earth bicarbonates. These alkali-earth bicarbonates have maximum solubilities (or saturation) in water which averages approximately 10%, thus, if the water contains insufficient carbon dioxide to form this 10% solution of bicarbonates, most of the carbon dioxide goes into production of alkali bicarbonates.

If, however, the water contains more carbon dioxide than is necessary to produce sufficient alkali-earth bicarbonates to completely saturate the water, then the additional carbon dioxide present is available as carbon dioxide for extraneous reactions. But before there will be enough carbon dioxide in carbonated water for reaction on the oil, it is necessary to have, in water solution, more than sufficient carbon dioxide to produce a minimum of approximately a 10% solution of alkali-earth bicarbonates.

To carbonate water to a point where it contains more than enough carbon dioxide to bring about this saturation of the soluble alkali-earth carbonates, it is necessary to impress carbon dioxide into the water at more than 100 p. s. i. and preferentially more than 400 p. s. i. partial pressure. Therefore, in attempting to obtain a carbon dioxide solution in an oil sand sufficient to obtain best results in increased oil recovery, it is necessary to inject a carbonated solution in which the partial pressure of the carbon dioxide is greater than 400 p. s. i., otherwise most or even substantially all of the carbon dioxide will be neutralized by the alkali-earths. Carbonated water, under a partial pressure of carbon dioxide greater than 400 p. s. i., will always contain substantial amounts of unneutralized carbon dioxide. Such carbonated water under such pressure has been found effective to accomplish adequate solution of alkali earth bicarbonates and can be safely injected into the input well without the liberation of carbon dioxide as a gas.

It is recognized that the carbonated water which is injected into the input well will lose a part of its carbon dioxide to the oil and water enveloping the oil sandstone or limestone constituting the oil structure. However, the carbon dioxide present in the carbonated water, 50% of saturation, is ample for most oil fields but occasionally the volume of water, etc., in the oil structure is such that a higher percent of saturation is needed in order to obtain the full yield of oils.

As is well known, carbon dioxide is readily soluble in petroleum, the solubility varying with the type of crude oil. In all types, however, it reduces the surface tension of the oil and in water-oil mixtures or emulsions it acts as a wetting agent. This reduction of surface tension aids the oil to break away from the sand particles and be propelled by the water as it flows through the reservoir rocks. This phenomena is well demonstrated by laboratory tests.

It is to be observed that my invention can be used alone or in conjunction with primary recovery or secondary recovery In the present specification, the following terms have the following meanings:

Bottom hole pressure means a pressure existing at bottom of either the injection or the producing well.

Bottom hole pressure is usually given in pounds per square inch. It has two components:

(a) the well head pressure
(b) the static head or the weight of a column of fluid in the well bore.

The static head for water is approximately .43 p. s. i. per foot of depth of the well.

Injection well bottom hole pressure is readily determined in water flooding because the static head of water is well known as is the well head pressure at which the water is introduced into the well. In the case of the production well, however, the bottom hole pressure can be practically nil in the case where the production well is pumped or a relatively high pressure in the case that the production well is throttled at well head and has a back pressure in addition to the static head of water, oil and gas in the well bore of the outlet well. By control of the well head pressures of injection and production wells, one is able to obtain almost any "mean reservoir pressure" that is desired for the mean reservoir pressure, which actually constitutes the pressure over most of the area of the oil sand between the injection well and the production well and which is the mean of the bottom hole pressures of the production and the injection well.

Oil structure is any geological structure, strata, oil sand, reservoir rocks, oil reservoir and the like in which oil has naturally accumulated.

Partial pressure of carbon dioxide means that fraction of the total pressure which is exercised upon the solvent liquid by the carbon dioxide alone when the carbon dioxide is the component of a gas mixture.

In a mixture of gases or vapors each constituent can be regarded as making a contribution to the total pressure equal to the pressure which the same amount of the constituent would exert if it were alone present in an evacuated vessel of the same volume as that which contains the gaseous mixture.

In speaking of the partial pressure of the carbon dioxide, it probably should be brought out that one cannot consider natural gas dissolved in the crude oil as a gas which mixes with the carbon dioxide. Crude oil is composed of liquid and gaseous hydrocarbons that are mutually soluble. Therefore, natural gas dissolved in crude oil is not considered as being in the gas phase. In this particular reference the partial pressure of the carbon dioxide is that pressure in which the carbon dioxide plays in mixtures with gases extraneous to crude oil such as the gases in flue gas and exhaust gas. When in this type of gas mixture 10% of carbon dioxide (volumetric) will bring about a partial pressure of the carbon dioxide which is only 10% of the total pressure with which the gas mixture is applied. Thus, flue gas applied at 1000 p. s. i. would result in a partial pressure of carbon dioxide of approximately 100 p. s. i.

Pore volume means that portion of an oil sand not occupied by solids.

The pore volume is determined by first finding the porosity of the oil sand by means of core analysis. Multiplying percent porosity by the volume of oil sand will give one the pore volume of the oil sand. Normally, about 15% to 30% of an oil reservoir is pore volume.

High carbon dioxide-water ratio means a high volumetric proportion of carbon dioxide gas to water. This ratio varies from 6:1 up to 30:1. In this specification, it means volumetric proportions of free carbon dioxide at N. T. P. and the water in which the carbon dioxide is to be dissolved. The amount of carbon dioxide dissolved in the water shall preferably be less than sufficient to fully saturate or carbonate the water.

Percent carbonation means the amount of carbon dioxide dissolved in the water in relation to the full amount of carbon dioxide which can be dissolved in that water. As a generalization, it can be said at normal oil reservoir temperatures natural water may be carbonated to a full carbonation of 30 volumes of carbon dioxide per volume of water and a 20% of full carbonation would be equivalent to 6 volumes of carbon dioxide per volume of water.

Minimum percent carbonation means the lowest concentration of carbon dioxide in a water solution which will be effective to bring about increased oil recovery.

It is believed that this minimum concentration is influenced by the amount of carbon dioxide in aqueous solution necessary to neutralize or overcome the effect of calcium and magnesium salts found in all oil sands and we have determined that this minimum solution of carbon dioxide in aqueous solution is in the neighborhood of 20% of full carbonation or 6 volumes of carbon dioxide per volume of water, whichever is greater.

Maximum percent carbonation means the largest proportion of carbon dioxide that can be put into aqueous solution at the oil reservoir pressure and temperature, i. e., at the bottom hole pressure and temperature of the injection well.

It has been determined that unless the mean reservoir pressure falls substantially below the pressure at which the fully carbonated water is injected into the oil sand that the presence of the oil sand liquids will cause all of the carbon dioxide so injected to stay in solution during its passage through the oil sand. Because of the characteristics of the solubility curves of carbon dioxide in oil and water it has been determined that the mean reservoir pressure should not fall below a stated minimum of about 400 p. s. i.

Optimum percent carbonation means that percent carbonation which has been determined by experiment to release the most oil from the oil sand with the smallest concentration of carbonated water.

This optimum percent of carbonation has been determined to be within the range of 50% to 80% of full carbonation.

"Critical pressure" means the pressure at which the carbonated water must be applied to the oil sand in order to obtain increased oil recovery.

The "critical pressure" as used herein has no definite upper limit but has as it lower limit the pressure at which sufficient concentration of carbon dioxide can be maintained in the water to neutralize the effects of the ever present alkali earth salts. Experiments have indicated that this is below 400 p. s. i. While the reaction starts below 400 p. s. i., it is apparently complete at about 400 p. s. i. This minimum pressure as effecting the capability of water to dissolve carbon dioxide has a counterpart in that pressure at which carbon dioxide gas is liable to come out of solution in case fully carbonated water is injected in the sand. The two approaches to finding the lower limits of critical pressure are both based upon the phenomenon of carbon dioxide solubility and are sufficiently similar to use an approximate figure of 400 p. s. i. as the lower limit of critical pressures. As a generalization, the upper limit of critical pressure is that at which the applied reservoir pressure might rupture the cap rock. Such upper pressure is not substantially above one p. s. i. per foot of depth of the reservoir.

Critical concentration of carbon dioxide means a concentration which lies between the minimum percent carbonation and maximum percent carbonation defined above.

Pressure maintenance means the preservation of an existing oil reservoir pressure usually brought about by the injection of a fluid into an oil reservoir simultaneous with the withdrawal of reservoir fluids from the reservoir through the producing wells.

In solution gas reservoirs (i. e., oil reservoirs in which the oil contains natural gas in solution) any diminution in pressure would bring about an evolution of natural gas from the oil and thus the viscosity of the oil would be substantially increased, inhibiting its mobility. By maintaining pressure on the oil reservoir, the mobility of the oil is maintained.

Un-neutralized carbon dioxide solution means that portion of carbon dioxide in water solution which is not modified by the presence of soluble alkaline compounds.

The reaction to be compensated is largely the formation of bicarbonates due to the carbonic acid in the carbonated water. These bicarbonates are of limited solubility and it has been determined that when the concentration of carbonated water is greater than 20% of full carbonation (more than 6 volumes of carbon dioxide per volume of water) there is carbon dioxide present in excess of the amount required to form that amount of alkaline earth bicarbonates capable of being held in solution and that this additional carbon dioxide is then available for action upon hydrocarbons to forming compounds which have wetting agent capabilities.

Proportion means volumetric proportions, to wit, proportions of carbon dioxide to water is volume of carbon dioxide at N. T. P. to the volume of water into which the carbon dioxide will dissolve.

Percent of gas analyses given are proportions by volume of the gases if all components are at the same temperature and pressure.

The exact theory or mechanism of the reactions occurring in the novel process embodying the present invention is not fully known. However, it is believed that carbon dioxide first reacts in the oil sand to form compounds which act as wetting agents thus freeing the oil from the surface of the solids in the oil reservoir, whereas the second is that the viscosity of the treated oil is reduced by the carbon dioxide dissolved in the oil and the oil made to flow more rapidly toward the output well and that the treated oil with dissolved carbon dioxide is a better solvent for natural gas, if such gas is present, than oil with no dissolved carbon dioxide and the presence of dissolved natural gas decreases still more the viscosity and speeds up still more rapidly the flow of oil into the output well.

While the improved process can be carried into practice with any appropriate equipment, the arrangement illustrated in Fig. 6 is recommended for large scale operations at an oil field for an extended period. Of course, where a natural supply of carbon dioxide is available as in some gas fields in certain areas of the United States and where it is more economical and practical to use such a source of carbon dioxide, those skilled in the art know that such a source should be used. Generally speaking, it is believed that such a natural supply of carbon dioxide is found only now and then adjacent to an oil field to be treated. The same thing is true with respect to sources of manufactured carbon dioxide.

Referring to Fig. 6, it will be noted that an input or injection well I–W and an output or production well O–W are provided and extend into the underground structure containing the oil reservoir. High pressure water and compressed carbon dioxide are injected into the injection or input well via valved lines. The carbon dioxide or $CO_2$ gas is supplied from a suitable or standard carbon dioxide plant C–P, the construction of which is well known to those skilled in the art. From the carbon dioxide plant C–P, the $CO_2$ gas passes through valved lines to a compressor C which compresses the gas to the desired or selected injection pressure.

The critically-carbonated water is injected into the oil reservoir in the underground structure via the input well and effects the recovery of oil. The injection under pressure causes a water-carbon dioxide-oil mixture to flow to the surface of the ground via the production or output well O–W. From the output well via valved lines, the recovered oil in the mixture flows to a separator S. In this separator, the water-carbon dioxide-oil mixture separates and the separated water can be removed from the bottom of the separator via a valved line W–L, the recovered oil via an intermediate valved line O–L and the carbon dioxide or carbon dioxide gas via an upper valved line G–L. The recovered oil is sent to a suitable recovery or distillation plant (not shown) whereas the carbon dioxide or carbon dioxide gas is preferably recycled and returned via valved line G–L to compressor C. Such recycled carbon dioxide gas supplements the supply coming from the plant C–L. In all other respects, the operations of the improved process as carried into practice in the equipment illustrated in Fig. 6 is the same or similar to those conducted in the equipment illustrated in Fig. 1 as described in detail hereinbefore.

Tests conducted with the improved process have shown that approximately 20% carbonation is a critical value for carbonated water when used for oil recovery. Thus, Fig. 7 illustrates a curve showing the relations between percent carbonation of carbonated water and the oil removed in percent of recoverable oil. This curve was made from laboratory tests using carbonated water of various concentrations (percent carbonation) on unconsolidated sand. The Penn grade crude which was used and recovered, is similar to those heretofore referred to in connection with tests conducted in oil fields near Richburg, New York. The curve starts near the origin of the coordinates, rises upwardly and curvedly, and finally approaches the 100% of recoverable oil asymptotically. Tangent T–1 on the lower part of the curve and tangent T–2 on the upper part of the curve cross each other at approximately 20% carbonation of carbonated water which shows that this is a point of inflection and critical value. This curve made from laboratory tests confirms other tests showing that 20% carbonation is a critical value for carbonated water. In other words, carbonated water of 20% carbonation is a critically-carbonated water. The same thing is true of carbonated waters containing up to 100% carbonation.

The present application is a continuation-in-part application of my co-pending applications, Serial No. 64,402, filed December 9, 1948, and Serial No. 101,678, filed June 27, 1949, which applications serving to carry the date of common subject matter herein back to the earlier filing dates through continuity of such subject matter, have been abandoned subsequent to and in view of the instant continuation-in-part application.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A method of effecting further production of petroleum from an underground structure, having at least one input and one output well, without substantially fractionating the petroleum therein and precipitating the resultant heavier ends thereof in the oil structure, comprising establishing an aqueous solution of carbon dioxide in the underground oil structure adjacent to the bottom of the input well, characterized in that said solution contains at least six volumes of carbon dioxide to one volume of water and not more carbon dioxide than will remain in solution within said structure, controlling said solution to maintain said volume ratios of carbon dioxide to water in said structure and to cause said solution to move through said structure towards said output well and withdrawing the resultant fluids through said output well.

2. A method of effecting further production of petroleum from an underground oil structure, having at least one input and one output well, without substantially fractionating the petroleum therein and precipitating the resultant heavier ends thereof in the oil structure, comprising establishing an aqueous solution of carbon dioxide in the underground oil structure adjacent to the bottom of the input well, characterized in that said solution contains at least ten volumes of carbon dioxide to one volume of water and not more than twenty-five volumes of carbon dioxide to one volume of water, controlling said solution to maintain said volume ratios of carbon dioxide to water within said structure and to cause said solution to move through said structure towards said output well and withdrawing the resultant fluids through said output well.

References Cited in the file of this patent

UNITED STATES PATENTS

| | | |
|---|---|---|
| 1,249,232 | Squires | Dec. 4, 1917 |
| 1,511,067 | Russell | Oct. 7, 1924 |
| 1,658,305 | Russell | Feb. 7, 1928 |
| 1,826,371 | Spindler | Oct. 6, 1931 |
| 2,182,286 | Doennecke et al. | Dec. 5, 1939 |
| 2,623,596 | Whorton et al. | Dec. 30, 1952 |

OTHER REFERENCES

New Recovery Tool from "Oil and Gas Journal," May 3, 1951. Pages 53 and 54.